United States Patent [19]

Ferch et al.

[11] 4,006,031
[45] Feb. 1, 1977

[54] CARBON BLACK PREPARATION FOR USE IN MINERAL BINDER

[75] Inventors: Horst Ferch, Bruchkobel; Hans Wagner, Maintal, both of Germany

[73] Assignee: Deutsche Gold- und Silber-Scheideanstalt vormals Roessler, Frankfurt, Germany

[22] Filed: May 28, 1975

[21] Appl. No.: 581,474

[30]     Foreign Application Priority Data

May 29, 1974   Germany ......................... 2426266

[52] U.S. Cl. ............................. 106/307; 106/308 Q
[51] Int. Cl.² ........................................ C09C 1/56
[58] Field of Search ....................... 106/308 Q, 307

[56]       References Cited
       UNITED STATES PATENTS

| 3,075,852 | 1/1963 | Bonora | 106/308 Q |
| 3,245,971 | 4/1966 | Iserson | 260/29.6 MM |
| 3,839,254 | 10/1974 | Fang | 106/308 Q |

Primary Examiner—Winston A. Douglas
Assistant Examiner—J. V. Howard
Attorney, Agent, or Firm—Cushman, Darby & Cushman

[57]          ABSTRACT

Aqueous carbon black compositions are made containing fluorine containing wetting agents to increase the stability to weather. The carbon black compositions are useful in mineral binder systems, for example for concrete, slate, clear concrete, asbestos concrete and exterior plaster formulations.

21 Claims, No Drawings

CARBON BLACK PREPARATION FOR USE IN MINERAL BINDER

The invention is concerned with wetting agents containing aqueous carbon black compositions useful for working into mineral binder systems, for example for concrete, slate, clear concrete, asbestos concrete and exterior plaster formulations.

These carbon black compositions serve to impart outside weather stability and durable black pigmentation to mineral binder systems into which they are worked.

It is known to add pigment dispersions for coloring purposes to aqueous mineral binder systems, for example a cement-sand mixture, and then to install the setting process. For the production of black colored systems it is all known to intermix carbon black dispersions which contain wetting or dispersing agents.

In known manner carbon blacks are produced in a series of different qualities. Thus there are produced flame, furnace and gas or channel blacks. The differences present in the particle size, surface structure, surface size, pH value and density result in different wetting properties and dispersibility for the different types of carbon black. Depending on these properties which range from hydrophilic to hydrophobic different wetting or dispersing agents are added. For example with very nonpolar blacks there are added wetting agents in the production of aqueous carbon black dispersions in order to make the carbophile surface of the starting black somewhat hydrophilic. Besides there are added surface active materials such as wetting or dispersing agents in the production of carbon black dispersions in order to disperse the carbon black used optimally and to stabilize the degree of dispersion.

As wetting or dispersing agents there are used anion active or nonionic materials, as for example, alkylaryl sulfonates, lignosulfonates or polyethyleneglycol derivatives.

The carbon black dispersions produced thereby as a rule are fluid, pasty or powdery systems. Their composition can consist of for example, about 35 parts of water, 60 parts of carbon black (pigment) and 5 parts of wetting agent.

In the use of these known carbon black dispersions it has been found that the weathering stability of the corresponding colored binder systems, for example slate, leaves something to be desired that the intensity of the color is greatly reduced on the surface with long weathering. The cause of this weathering phenomenon has not yet been discovered. Therefore there are doubts as to whether the previously used carbon black dispersions used in place of inorganic pigments such as $Fe_3O_4$ or iron oxide red permit the maintenance of a comparable quality standard.

Surprisingly it has now been found that by using certain carbon black preparations, preferably produced in powder form, there can be obtained a substantially increased weathering stability of carbon black pigmented binder systems.

The invention concerns wetting agents containing aqueous carbon black preparations suitable for working into mineral binder systems, for example for concrete, slate, clear concrete, asbestos concrete and exterior plaster formulations which are characterized by a content of a fluorine containing wetting agent to increase the weathering stability.

Slates which were produced by the same recipe and process and which differed only in the wetting or dispersing agents used were exposed for over a year to weathering and then compared with corresponding original samples. The slates in which there were used the wetting or dispersing agents of the prior art showed a definite weakening in the color intensity compound to the original samples. They were strongly faded.

In contrast the slates in which there were used the wetting or dispersing agents of the invention showed no lightening in comparison to the original samples. They were identical with the unweathered sample slates.

As fluorine containing wetting or dispersing agents there can be used anion active and non-ionic agents.

Alkali salts, e.g. sodium and potassium salts, of arylsulfonic acids perfluoroalkene ethers, for example, belong to the first group and show a good activity. They can be produced for example by reaction of a perfluoroalkene of the general formula $C_nF_{2n}$ where $n$ is at least 2 and for example is $\leq 10$, preferably $C_{10}F_{20}$ with an alkali metal salt of a phenol sulfonic acid, e.g. phenolsulfonic acid or toluenesulfonic acid (o, m, or p).

Perfluoroalkene ethers of alkane diols, for example, belong to the second class and can be prepared for example by reaction of a perfluoroalkene of the formula $C_nF_{2n}$ where $n$ is as defined above and is preferably 10 with a polyethylene glycol of the general formula $HO(CH_2CH_2O)_mH$ where $m$ is at least two and for example can be $\leq 23$ preferably with $HO(CH_2CH_2O)_{23}H$. Both $m$ and $n$ can be higher than the illustrative examples.

As perfluoroalkenols and perfluoroalkenes there can be used compounds where $n$ is 2, 3, 4, 5, 6, 7, 8, 9 or 10 for example or higher, e.g. 11 or 12. Similarly there can be used compounds where $m$ is 2, 3, 4, 5, 6, 7, 8, 9, 10, 11, 12, 13, 14, 15, 16, 17, 18, 19, 20, 21, 22 or 23 or higher, e.g. 24 or 25.

Examples of perfluoroalkene ethers of arylsulfonic acids are p-sodium benzenesulfonate perfluorodecenyl ether, p-potassium benzene sulfonate perfluorodecenyl ether, o-sodium benzene sulfonate perfluorodecenyl ether, sodium toluenesulfonate perfluorodecenyl ether, sodium p-benzenesulfonate perfluorohexenyl ether, sodium p-benzenesulfonate perfluorovinyl ether.

Examples of nonionic perfluoroalkene ethers are bis perfluorodecenyl ether of polyethylene glycol having 2, 6, 10 or 23 glycol units, bis perfluorohexenyl ether of polyethylene glycol having 2, 6 or 10 or 23 glycol units, bis perfluorohexenyl ether of polyethylene glycol having 2, 6, 10 or 23 glycol units, bis perfluorovinyl ether of polyethylene glycol having 2, 5, 10 or 23 glycol units.

The perfluoroalkene of the general formula $C_nF_{2n}$, for example, where $n = 10$ used as starting material for both types of wetting agents is a branches chain hydrocarbon. Preferably this has the structure $(C_2F_5)_2C(CF_3) - C(CF_3) = CF(CF_3)$ with the empirical formula $C_{10}F_{20}$.

If there is used the perfluoroalkene $C_{10}F_{20}$ in the production of alkali salts of the arylsulfonic acidperfluoro ether there is obtained for example, the anion active wetting agent of the formula $C_{10}F_{19}-OC_6H_4-SO_3Na$.

A preferred nonionic wetting agent produced with the perfluoroalkene $C_{10}F_{20}$ and the group polyethylene glycol is the polyethylene glycol bisperfluoroalkene ether of the structure $C_{10}F_{19}O(CH_2CH_2O)_{23}C_{10}F_{19}$.

The wetting agent is added in amounts of 0.02-0.4%, preferably 0.08-0.3% based on the weight of the carbon black. In individual cases the amount of wetting agent added is adjusted according to the composition of the binder agent system, especially according to the type of carbon black used, whereby the amount of wetting agent can exceed that mentioned.

For the pigmentation of concrete slates there have proven especially useful the blacks of the class LFI (Long Flow Impingement), RCC (Regular Color Channel), MCF (Medium Color Furnace) FCFm (Fine Color Furnace modified), FCF (Fine Color Furnace). There can also be used mixtures of these carbon blacks. The use of fluorine containing wetting or dispersing agents provided within the scope of the invention guarantees an optimal distribution of the carbon black and the stabilization of the degree of distribution in an aqueous carbon black preparation, whereby in reference to the type of carbon black used there is furnished the possibility of a wide variation.

Exceptionally favorable is the influence of the fluorine containing wetting or dispersing agents on the coloristic appearance, i.e. the weathering behavior of the mineral binding agent, into which the carbon black dispersions of the invention are worked. Even in weathering for a year as can be seen from the examples, mineral binders pigmented with the carbon black preparations of the invention keep their color character.

Unless otherwise indicated all parts and percentages are by weight.

The invention will be explained further in the following examples and there will also be given comparisons with the state of the art.

I. PRODUCTION OF CARBON BLACK PREPARATIONS

EXAMPLE 1 (STATE OF THE ART)

| | |
|---|---|
| Special black 4 | 92 grams |
| Vanisperse CB = hydroxylignin | 1 gram |
| (lignin sulfonate) | |
| Water | 5 grams |
| Silica VN 3 (precipitated silica) | 2 grams |
| | 100 grams |

The carbon black was placed in the edge mill, size 0 and the necessary amounts of wetting agent and water added during about 5 minutes. Hereafter it was ground for 30 minutes.

EXAMPLE 2

| | |
|---|---|
| Special black 4 | 80 grams |
| $C_{10}F_{19}OC_6H_4SO_3Na$ | 0.2 gram |
| Water | 19.8 grams |
| | 100 grams |

This formulation was worked up in the same manner as in Example 1.

EXAMPLE 3

| | |
|---|---|
| Special black 4 | 80 grams |
| $C_{10}F_{19}O(CH_2CH_2O)_{23}C_{10}F_{19}$ | 0.2 grams |
| Water | 19.8 grams |
| | 100 grams |

This formulation was worked up in the same manner as in Example 1.

The carbon black "Special black 4" used in Example 1 to 3 has the following properties:

| | | |
|---|---|---|
| Electron microscopic particle diameter | 25 | mμ |
| Tamped density DIN 53194 | 0.19 | g/ml |
| Oil demand FP | 300% | (g/100g) |
| pH value | 3 | |
| Surface area (BET) | 180 | m²/g |

It belongs to the class LFI (Long Flow Impingement) DIN stands for German Industrial Standard.

EXAMPLE 4

| | |
|---|---|
| Lamp black 101 (Flammruss 101) | 92 grams |
| Vanisperse CB = Hydroxylignin | 1 gram |
| (lignin sulfonate) | |
| Silica VN 3 (precipitated silica) | 2 grams |
| Water | 5 grams |
| | 100 grams |

This formulation was worked up in the same manner as in Example 1.

EXAMPLE 5

| | |
|---|---|
| Lamp black 101 | 80 grams |
| $C_{10}F_{19}OC_6H_4SO_3Na$ | 0.2 gram |
| Water | 19.8 grams |
| | 100 grams |

This formulation was worked up in the same manner as in Example 1.

EXAMPLE 6

| | |
|---|---|
| Lamp black 101 | 80 grams |
| $C_{10}F_{19}O(CH_2CH_2O)_{23}C_{10}F_{19}$ | 0.2 gram |
| Water | 19.8 grams |
| | 100 grams |

This formulation was worked up in the same manner as in Example 1.

The carbon black, lamp black 101 (Flammruss 101) used in Examples 4 to 6 has the following properties.

| | | |
|---|---|---|
| Electron microscopic particle diameter | 95 | mμ |
| Tamped density DIN 53194 | 0.31 | g/ml |
| Oil demand FP | 28% | (g/100g) |
| pH value | 7 | |
| Surface area (BET) | 21 | m²/g |

It belongs to the class MCF Lamp black.

EXAMPLE 7 (STATE OF THE ART)

| | |
|---|---|
| Printex A | 92 grams |
| Vanisperse CB = hydroxylignin | 1 gram |
| (lignin sulfonate) | |
| Silica VN 3 (precipitated silica) | 2 grams |

EXAMPLE 7 (STATE OF THE ART) -continued

| | |
|---|---|
| Water | 5 grams |
| | 100 grams |

This formulation was worked up in the same manner as in Example 1.

EXAMPLE 8

| | |
|---|---|
| Printex A | 80 grams |
| $C_{10}F_{19}OC_6H_4SO_3Na$ | 0.2 gram |
| Water | 19.8 grams |
| | 100 grams |

This formulation was worked up in the same manner as Example 1.

EXAMPLE 9

| | |
|---|---|
| Printex A | 80 grams |
| $C_{10}F_{19}O(CH_2CH_2O)_{23}C_{10}F_{19}$ | 0.2 gram |
| Water | 19.8 grams |
| | 100 grams |

This formulation was worked up in the same manner as in Example 1.

The carbon black, Printex A, used in Examples 7 to 9 has the following properties.

| | | |
|---|---|---|
| Electron microscopic particle diameter | 41 | m$\mu$ |
| Tamped density DIN 53194 | 0.30 | g/ml |
| Oil demand FP | 300% | (g/100g) |
| pH value | 8 | |
| Surface area (BET) | 46 | m$^2$/g |

It belongs to the carbon black class MCF (Medium Color Furnace).

EXAMPLE 10 (STATE OF THE ART)

| | |
|---|---|
| Russ L-TD (Black L-TD) | 92 grams |
| Vanisperse CB = hydroxylignin (lignin sulfonate) | 1 gram |
| Silica VN 3 (precipitated silica) | 2 grams |
| Water | 5 grams |
| | 100 grams |

This formulation was worked up as in Example 1.

EXAMPLE 11

| | |
|---|---|
| Russ L-TD | 80 grams |
| $C_{10}F_{19}OC_6H_4SO_3Na$ | 0.2 gram |
| Water | 19.8 grams |
| | 100 grams |

This formulation was worked up as in Example 1.

EXAMPLE 12

| | |
|---|---|
| Russ L-TD | 80 grams |
| $C_{10}F_{19}O(CH_2CH_2O)_{23}C_{10}F_{19}$ | 0.2 gram |
| Water | 19.8 grams |
| | 100 grams |

This formulation was worked up as in Example 1.

The carbon black, Russ L-TD, used in Examples 10 and 12 has the following properties.

| | | |
|---|---|---|
| Electron microscopic particle diameter | 35 | m$\mu$ |
| Tamped density DIN 53194 | 0.17 | g/ml |
| Oil demand FP | 360% | (g/100g) |
| pH value | 8 | |
| Surface area (BET) | 80m$^2$/g | |

It belongs to the carbon black class RCC (Regular Color Channel).

II. PRODUCTION OF THE SPECIMEN BRICK

EXAMPLE 13

The following process was used to work the carbon black preparations corresponding to Examples 1 to 12 into mineral binders.

5 grams of the carbon black preparation according to Examples 1 to 12
100 grams of cement (EPZ 275)
300 grams of sand (0–3.15 mm)
25 grams of water This formulation was mixed in the mortar mixer during 10 minutes.

For the production of specimen bricks the mixture obtained according to example 13 was filled into a mold and pressed to sample bricks with 300 kp/cm$^2$ by means of an oil pressure press.

These sample bricks were dried at room temperature (24° C.).

In order to test the weathering properties the bricks made according to Example 13 were exposed to the weather for a year. The location was the roof of an industrial building and had a southern orientation. The samples were compared with non-weathered sample stones every 4 months. Hereby it was shown that the samples of Examples 1, 4, 7 and 10 already after 4 months were a trace lighter than the original samples.

The reviewing after 12 months showed that all sample bricks of Examples 1, 4, 7 and 10 which were weathered had a significant fading compared to the original sample. In contrast each of the bricks containing carbon black preparations according to Examples 2, 3, 5, 6, 8, 9, 11 and 12 which had been weathered (in regard to color intensity) was identical with the original samples.

Optical measurements confirmed the above subjectively observed results. There was used the spectrophotometric process according to DIN 5033 (apparatus Elrepho/Zeiss).

The following table reproduces the values for several of the bricks produced with different wetting agents. Here there were compared the value Y which shows the difference between weathered and weathered bricks.

TABLE

| WETTING AGENT USED | Y WEATHERED MINUS Y UNWEATHERED |
|---|---|
| Lignin sulfonate (hydroxylignin) (Examples 1, 4, 7, 10) | 7.4 |
| Wetting agent (corresponding to Examples 2, 5, 8, 11) | 1.9 |
| Wetting agent (corresponding to Examples 3, 6, 9, 12) | 1.8 |

EXAMPLE 14

For coloring concrete a carbon black preparation in a 200 kg formulation was produced according to the following recipe on the edge mill.

| | |
|---|---|
| 80 | parts carbon black Printex A |
| 0.1 | part wetting agent $C_{10}F_{19}O(CH_2CH_2O)_{23}C_{10}F_{19}$ |
| 19.9 | parts water |
| 100 | parts |

The carbon black Printex A had the properties set forth in connection with Examples 9 to 12.

The carbon black was placed in the edge mill and there were added during 15 minutes the wetting agent which had been previously dissolved in the necessary amount of water. After finishing the water-wetting agent addition the mixture was ground for 60 minutes.

The entire formulation after the grinding in the edge mill was ground with a progressive hammer mill with screens and then filled into water repellant polyethylene coated sacks.

The well produced carbon black preparations on this scale had the desired properties. They can be readily worked into mineral-binders systems, as for example concrete system, which then shown that the compounds of the invention have good weathering properties.

The compositions can comprise, consist essentially of or consist of the materials set forth.

What is claimed is:

1. A composition suitable for use in preparing a carbon black containing mineral binder of improved weathering stability consisting essentially of an aqueous carbon black mixture including 0.02 to 0.4% by weight of the carbon black of a fluorine containing wetting agent.

2. A composition according to claim 1 wherein the wetting agent is an anion active wetting agent.

3. A composition according to claim 2 wherein the wetting agent is an alkali metal salt of an arylsulfonic acid perfluoro alkene ether.

4. A composition according to claim 3 wherein the wetting agent is an alkali metal salt of a phenolsulfonic acid perfluoro alkene ether.

5. A composition according to claim 4 wherein the perfluoro alkene ether has up to 23 carbon atoms.

6. A composition according to claim 5 wherein the wetting agent is the perfluorodecenyl ether of the sodium salt of phenolsulfonic acid.

7. A composition according to claim 3 wherein the wetting agent is present in an amount of 0.08 to 0.3% by weight of the carbon black.

8. A composition according to claim 1 wherein the wetting agent is a nonionic wetting agent.

9. A composition according to claim 8 wherein the wetting agent is a polyethylene glycol perfluoroalkene ether.

10. A composition according to claim 9 wherein the wetting agent has the formula $C_nF_{2n}O(CH_2CH_2O)_mC_nF_{2n}$ where $n$ is an integer of at least 2 and $m$ is an integer of at least 2.

11. A composition according to claim 10 wherein $n$ is 2 to 10 and $m$ is 2 to 23.

12. A composition according to claim 11 wherein $n$ is 10 and $m$ is 23.

13. A composition according to claim 9 wherein the wetting agent is present in an amount of 0.08 to 0.3% by weight of the carbon black.

14. A composition according to claim 1 wherein the carbon black is a Regular Color Channel black.

15. A composition according to claim 1 wherein the carbon black is a Fine Color modified furnace black.

16. A composition according to claim 1 wherein the carbon black is a Medium Color furnace black.

17. A composition according to claim 1 wherein the carbon black is a Fine Color furnace black.

18. A mineral binder composition consisting essentially of a mineral binder and the carbon black and wetting agent of claim 1 as a pigment therefor.

19. A composition according to claim 18 wherein the mineral binder is selected from the group consisting of concrete slate, clear concrete, asbestos concrete and exterior plaster.

20. A composition according to claim 19 wherein the mineral binder contains cement and sand.

21. A composition according to claim 1 consisting of (1) water, (2) carbon black and (3) said fluorine containing wetting agent.

* * * * *